United States Patent
Liu et al.

(10) Patent No.: US 12,148,698 B2
(45) Date of Patent: Nov. 19, 2024

(54) SEMICONDUCTOR DEVICE AND SEMICONDUCTOR DEVICE MANUFACTURING METHOD

(71) Applicant: REALTEK SEMICONDUCTOR CORPORATION, Hsinchu (TW)

(72) Inventors: Chien Cheng Liu, Hsinchu (TW); Yun Chih Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 673 days.

(21) Appl. No.: 17/138,917

(22) Filed: Dec. 31, 2020

(65) Prior Publication Data
US 2021/0210430 A1    Jul. 8, 2021

(30) Foreign Application Priority Data
Jan. 6, 2020    (TW) .................. 109100365

(51) Int. Cl.
| | | |
|---|---|---|
| *H01L 23/528* | (2006.01) | |
| *G06F 30/392* | (2020.01) | |
| *G06F 30/398* | (2020.01) | |
| G06F 119/06 | (2020.01) | |
| G06F 119/12 | (2020.01) | |

(52) U.S. Cl.
CPC ........ *H01L 23/5286* (2013.01); *G06F 30/392* (2020.01); *G06F 30/398* (2020.01); *G06F 2119/06* (2020.01); *G06F 2119/12* (2020.01)

(58) Field of Classification Search
CPC . H01L 23/5286; G06F 30/392; G06F 30/398; G06F 2119/12; G06F 2119/06
USPC ......................................................... 257/207
See application file for complete search history.

(56) References Cited

U.S. PATENT DOCUMENTS

| | | |
|---|---|---|
| 2011/0205680 A1 | 8/2011 | Kidd et al. |
| 2018/0364749 A1 | 12/2018 | Tanadi |

FOREIGN PATENT DOCUMENTS

| | | | |
|---|---|---|---|
| JP | 2011199094 A | | 10/2011 |
| JP | 2011243794 A | * | 12/2011 |
| JP | 2012094886 A | | 5/2012 |

OTHER PUBLICATIONS

Machine English Translation of JP-2011243794-A. 2011.*
English Machine Translation of Kato-3794. Dec. 2011.*
English abstract of JP2011199094A.
English abstract of JP2011243794A.
English abstract of JP2012094886A.

* cited by examiner

*Primary Examiner* — Hrayr A Sayadian
(74) *Attorney, Agent, or Firm* — WPAT, P.C.; Anthony King (57) ABSTRACT

The application discloses a semiconductor device and a semiconductor device manufacturing method. The semiconductor device includes: a substrate; a circuit macro on the substrate; a plurality of metal layers over the substrate, wherein the plurality of metal layers include a first power mesh; and a plurality of power switch circuits on the substrate, wherein the power switch circuits selectively couple a power to the first power mesh according to a control signal, and the power switch circuits are arranged in sequence, wherein a control signal output terminal of each first power switch circuit is coupled to a control signal input terminal of a following first power switch circuit, so that the control signal passes through the first power switch circuits sequentially.

12 Claims, 6 Drawing Sheets

SEMICONDUCTOR DEVICE AND SEMICONDUCTOR DEVICE MANUFACTURING METHOD

CROSS REFERENCE TO RELATED APPLICATIONS

This application claims priority of Taiwan application No. 109100365 filed on Jan. 6, 2020, which is incorporated by reference in its entirety.

BACKGROUND

Field of the Invention

The present application relates generally to a semiconductor device; in particular, to a semiconductor device having a plurality of serially connected power switch circuits and an associated semiconductor device manufacturing method.

Description of Related Art

In a system-on-chip (SoC), it is often necessary to individually manage the power supply of different circuit macros; generally, a plurality of power switch circuits are controlled simultaneously in a tree-like manner, so as to control a specific circuit macro to exit or enter the power saving mode. However, with the scaling up of the circuit size and power consumption, one should take extra care to the control of the power switch circuits to avoid affecting the stability of the SoC.

BRIEF SUMMARY OF THE INVENTION

Some embodiments of the present disclosure provide a semiconductor device, powered by a power supply. The semiconductor device includes: a substrate; a circuit macro, disposed on the substrate, wherein the circuit macro is configured to execute a specific function; a plurality of metal layers, disposed over the substrate, wherein the plurality of metal layers include: a first power mesh, including a plurality of metal lines extending along a first direction from a first side of the circuit macro to a second side of the circuit macro, wherein the first power mesh is coupled to the circuit macro; and a plurality of first power switch circuits, disposed on the substrate, wherein each of the plurality of first power switch circuits includes: a control signal input terminal, configured to receive a control signal; a control signal output terminal, configured to output the control signal; a power input terminal, coupled to the power supply; and a power output terminal, coupled to the first power mesh; wherein the plurality of first power switch circuits selectively couple the power supply to the first power mesh according to the control signal, respectively, and the plurality of first power switch circuits are arranged in sequence, wherein the control signal output terminal of each first power switch circuit is coupled to the control signal input terminal of a next first power switch circuit, so that the control signal passes through the plurality of first power switch circuits sequentially.

Some embodiments of the present disclosure provide a semiconductor device manufacturing method, including: introducing design information of a circuit macro; estimating a number and locations of a plurality of first power switch circuits in a layout according to the design information and accordingly disposing the plurality of first power switch circuits at a first side of the circuit macro, and establishing a first power mesh according to the design information, so that the plurality of first power switch circuits selectively couple a power supply to the first power mesh according to a control signal, wherein the plurality of first power switch circuits are arranged in sequence, and a control signal output terminal of each first power switch circuit is coupled to a control signal input terminal of a next first power switch circuit, so that a control signal passes through the plurality of first power switch circuits sequentially; performing cell placement of the circuit macro according to the design information and the first power mesh so as to generate a cell placement result; and manufacturing the semiconductor device according to the cell placement result.

The semiconductor device and the associated semiconductor device manufacturing method can improve stability of SoC systems.

BRIEF DESCRIPTION OF THE DRAWINGS

Aspects of the present disclosure are best understood from the following detailed description when read with the accompanying drawings. It is noted that, in accordance with the common practice in the field, various features are not drawn to scale. In fact, the dimensions of the various features may be arbitrarily increased or reduced for the purpose of discussion.

DETAILED DESCRIPTION

Figure 1:
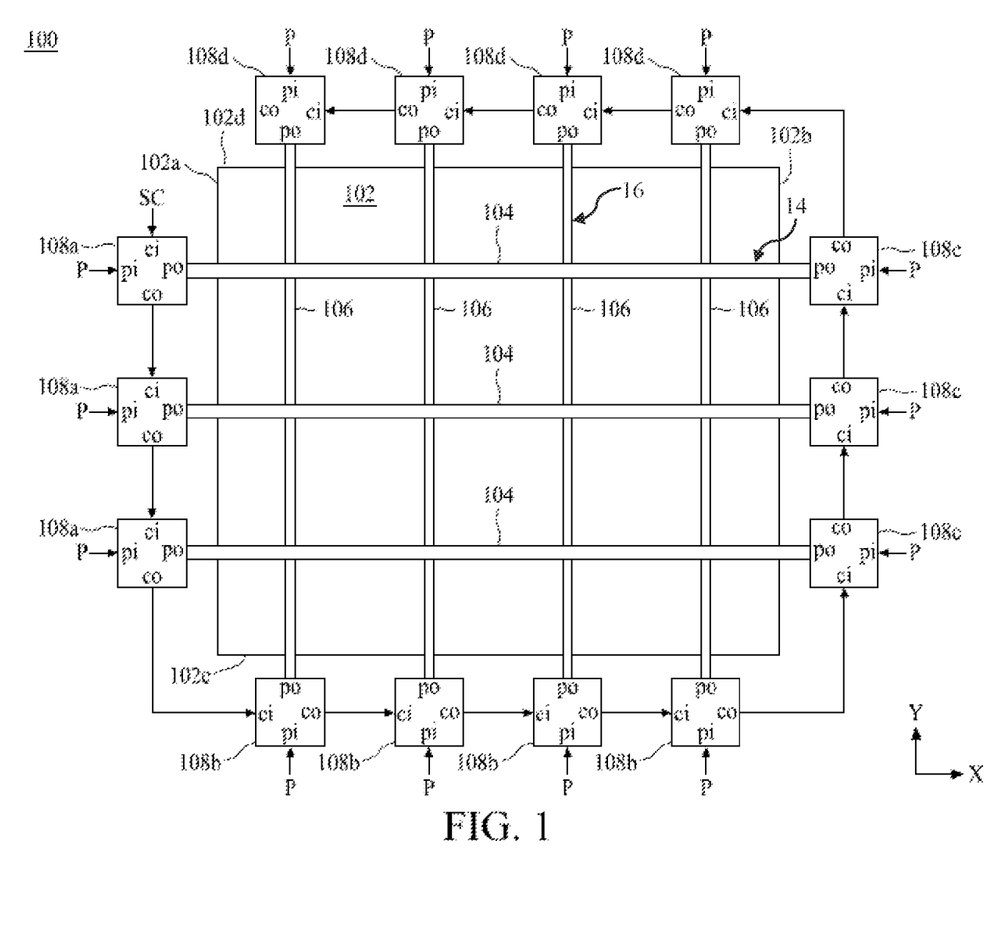
FIG. 1 is schematic diagram of a semiconductor device according to the first embodiment of the present application.

FIG. 1 is schematic diagram of a semiconductor device according to the first embodiment of the present application. The semiconductor device 100 includes a circuit macro 102 disposed on the semiconductor substrate (not shown in the drawing), wherein the circuit macro 102 may be implemented with a specific manufacturing process (e.g., CMOS process) and it is a semiconductor circuit capable of executing a specific function. In the present embodiment, the circuit macro 102 has a square shape, which has sequentially, in a counter-clockwise direction, a first side 102*a*, a third side 102*c*, a second side 102*b* and a fourth side 102*d*; however, the present application is not limited thereto. In other embodiments, the circuit macro 102 may have a polygonal shape other than square. The circuit macro 102 can be integrated in an SoC and is powered by a power supply P, wherein the SoC may include, in addition to circuit macro 102, other circuit macros (not shown in the drawing) that are powered by the power supply P, and the plurality of circuit macros may be subjected to power supply management individually; for example, on can make a specific circuit macro in the SoC exit or enter the power saving mode alone. Excess inrush current may be generated temporarily when waking up a specific circuit macro in the SoC suddenly, thereby causing a sudden decrease in the power supply to other circuit macros in the SoC, and may even cause functional errors in serious cases. In the following discussions, the circuit macro 102 is used as an example to illustrate how to decrease the inrush current when making the circuit macro 102 exit the power saving mode (i.e., power on) according to the present application, so as to reduce the power supply impact to other circuit macros in the SoC.

In the present embodiment, the semiconductor device 100 includes a plurality of metal layers (not shown in the drawing) disposed over the semiconductor substrate, wherein the uppermost layer (i.e., the metal layer that is farthest from the semiconductor substrate) of the plurality of metal layers has a first power mesh 14 disposed therein, wherein the first power mesh 14 includes a plurality of metal lines 104 arranged in parallel and extending along the X-axis direction from the first side 102a of the circuit macro 102 to the second side 102b of the circuit macro 102 to cover the circuit macro 102, wherein the first power mesh 14 is coupled to the circuit macro 102 via the plurality of metal layers and through holes. The next-to-top layer (i.e., the metal layer that is second-farthest from the semiconductor substrate) of the plurality of metal layers has a second power mesh 16 disposed therein, wherein the second power mesh 16 includes a plurality of metal lines 106 arranged in parallel and extending along the Y-axis direction from the third side 102c of the circuit macro 102 to the fourth side 102d of the circuit macro 102 to cover the circuit macro 102, wherein the second power mesh 16 is coupled to the circuit macro 102 via the plurality of metal layers and through holes. In this case, the Y-axis direction is perpendicular to the X-axis direction. As could be appreciated, in other embodiments, persons having ordinary skill in the art may, depending on the actual need, dispose a plurality of metal lines 104 of the first power mesh 14 in a non-parallel manner yet substantially extending along the first direction from the first side 102a of the circuit macro 102 to the second side 102b, and dispose a plurality of metal lines 106 of the second power mesh 16 in a non-parallel manner yet substantially extending along the second direction from the third side 102c of the circuit macro 102 to the fourth side 102d, wherein the first direction differs from the second direction. Moreover, not a limitation of the present application but depending on the actual process need, the first power mesh 14 and the second power mesh 16 may be disposed in metal layers of the plurality of metal layers other than the uppermost layer and the next-to-top layer. The first power mesh 14 is the primary power mesh, the second power mesh 16 is the secondary power mesh, and the line width of the plurality of metal lines 104 is greater than the line width of the plurality of metal lines 106; in the present embodiment, the semiconductor device 100 provides a plurality of first power switch circuits 108a, a plurality of second power switch circuits 108b, a plurality of third power switch circuits 108c and a plurality of fourth power switch circuits 108d (hereinafter, the power switch circuits 108a to 108d, respectively) disposed around the circuit macro 102. Specifically, the power switch circuits 108a (three are shown in FIG. 1; however, the present application is not limited thereto), the power switch circuits 108b (four are shown in FIG. 1; however, the present application is not limited thereto), the power switch circuits 108c (three are shown in FIG. 1; however, the present application is not limited thereto) and the power switch circuits 108d (four are shown in FIG. 1; however, the present application is not limited thereto) are disposed on the semiconductor substrate, and the power switch circuits 108a are disposed at the first side 102a of the circuit macro 102; the power switch circuits 108b are disposed at the third side 102c of the circuit macro 102; the power switch circuits 108c are disposed at the second side 102b of the circuit macro 102; and the power switch circuits 108d are disposed at the fourth side 102d of the circuit macro 102.

The functions and structures of the power switch circuits 108a to 108d are substantially the same, each has a control signal input terminal ci, a control signal output terminal co, a power input terminal pi and a power output terminal po. The control signal input terminal ci is configured to receive a control signal SC, the control signal output terminal co is configured to output the control signal SC, and the power input terminal pi is coupled to the power supply P. The power output terminal po of each of the power switch circuits 108a is coupled to the plurality of metal lines 104 of the first power mesh 14 at the end that is near the first side 102a of the circuit macro 102; the power output terminal po of each of the power switch circuits 108b is coupled to the plurality of metal lines 106 of the second power mesh at the end that is near the third side 102c of the circuit macro 102; the power output terminal po of each of the power switch circuits 108c is coupled to the plurality of metal lines 104 of the first power mesh 14 at the end that is near the second side 102b of the circuit macro 102; and the power output terminal po of each of the power switch circuits 108d is coupled to the plurality of metal lines 106 of the second power mesh 16 at the end that is near the fourth side 102d of the circuit macro 102. In certain embodiments, one power switch circuit may be coupled with a plurality of metal lines.

The power switch circuits 108a to 108d selectively couple the power supply P to the plurality of metal lines 104 of the first power mesh 14 or the plurality of metal lines 106 of the second power mesh 16 according to the control signal SC, respectively, to determine whether or not to supply the power to the circuit macro 102. The power switch circuits 108a to 108d surround the circuit macro 102 and are arranged in sequence (as shown in FIG. 1), in this way, the power switch circuits 108a to 108d form a power switch circuit series surrounding the circuit macro 102 by interconnecting the control signal output terminal co of a power switch circuit and the control signal input terminal ci of the next power switch circuit, thereby allowing the control signal SC to pass through the power switch circuits 108a to 108d sequentially.

In the present embodiment, when applying transition of the control signal SC to wake up the circuit macro 102 from the power saving mode, the power switch circuits 108a to 108d will be switched on one by one starting from the first one of the power switch circuits 108a (i.e., the power switch circuit 108a in FIG. 1 that the control signal first enters into); since the control signal SC need time to pass through each and every power switch circuit, it will not switch on all power switch circuits at the same time, thereby avoiding the generation of excess inrush current instantly. In this way, the circuit macros in the SoC other than the circuit macro 102 can operate normally under the operating voltage during this waking up process.

Figure 2:
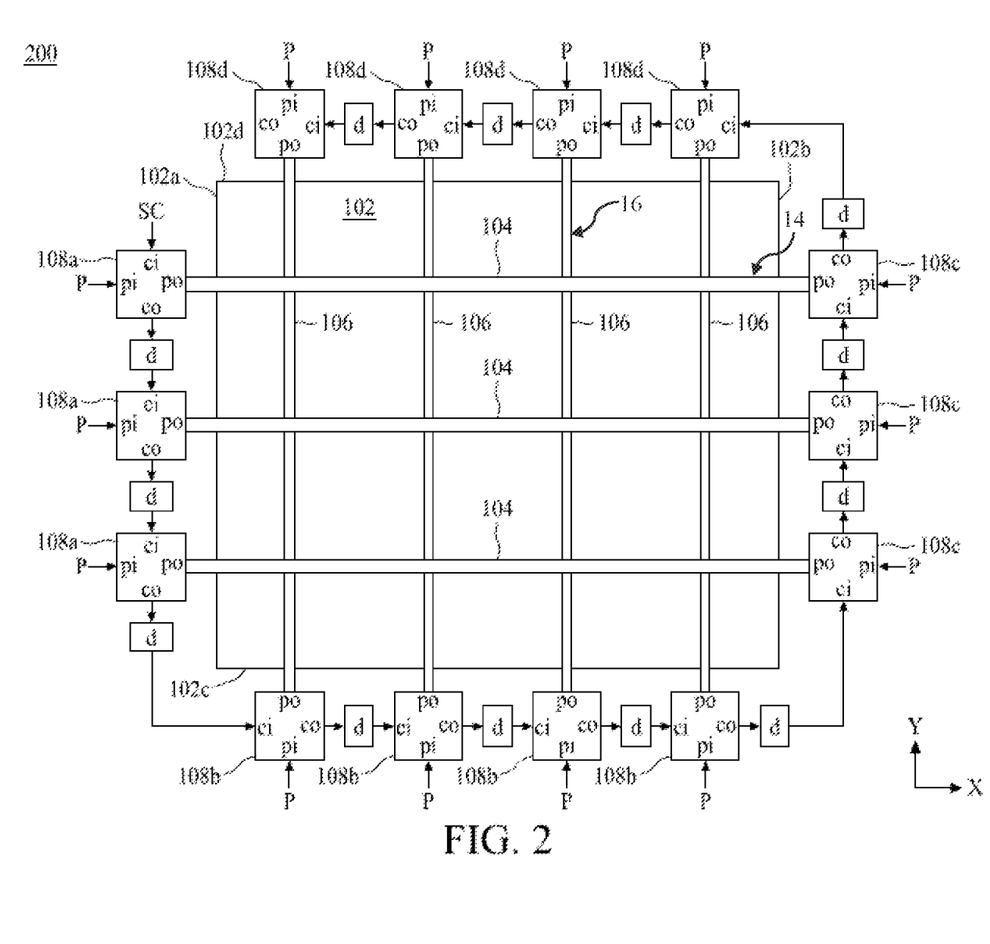
FIG. 2 is schematic diagram of a semiconductor device according to the second embodiment of the present application.

FIG. 2 is a schematic diagram of the semiconductor device according to the second embodiment of the present application. Compared with the semiconductor device 100 in FIG. 1, the semiconductor device 200 further includes a delay cell d between each power switch circuit; specifically, the delay cell d is disposed between the control signal output terminal co of one power switch circuit and the control signal input terminal ci of the next power switch circuit, so as to increase the overall time that the control signal SC requires to switch on all the power switch circuits 108a to 108d; and the longer the overall delay time resulted from the delay cell d, the longer the time interval between the turning on of each power switch circuit, thereby further reducing the inrush current of the macro 102. The length of times of which the plurality of delay cells d delay the control signal SC may be the same or different; in certain embodiments, the semiconductor device 200 further includes a delay control circuit (not shown in the drawing), which can control the length of time of which the plurality of delay cells d delay the control signal SC, individually or as a whole, so as to find the balance between reducing the inrush current of the circuit macro 102 and increasing the voltage ramp-up time.

Figure 3:
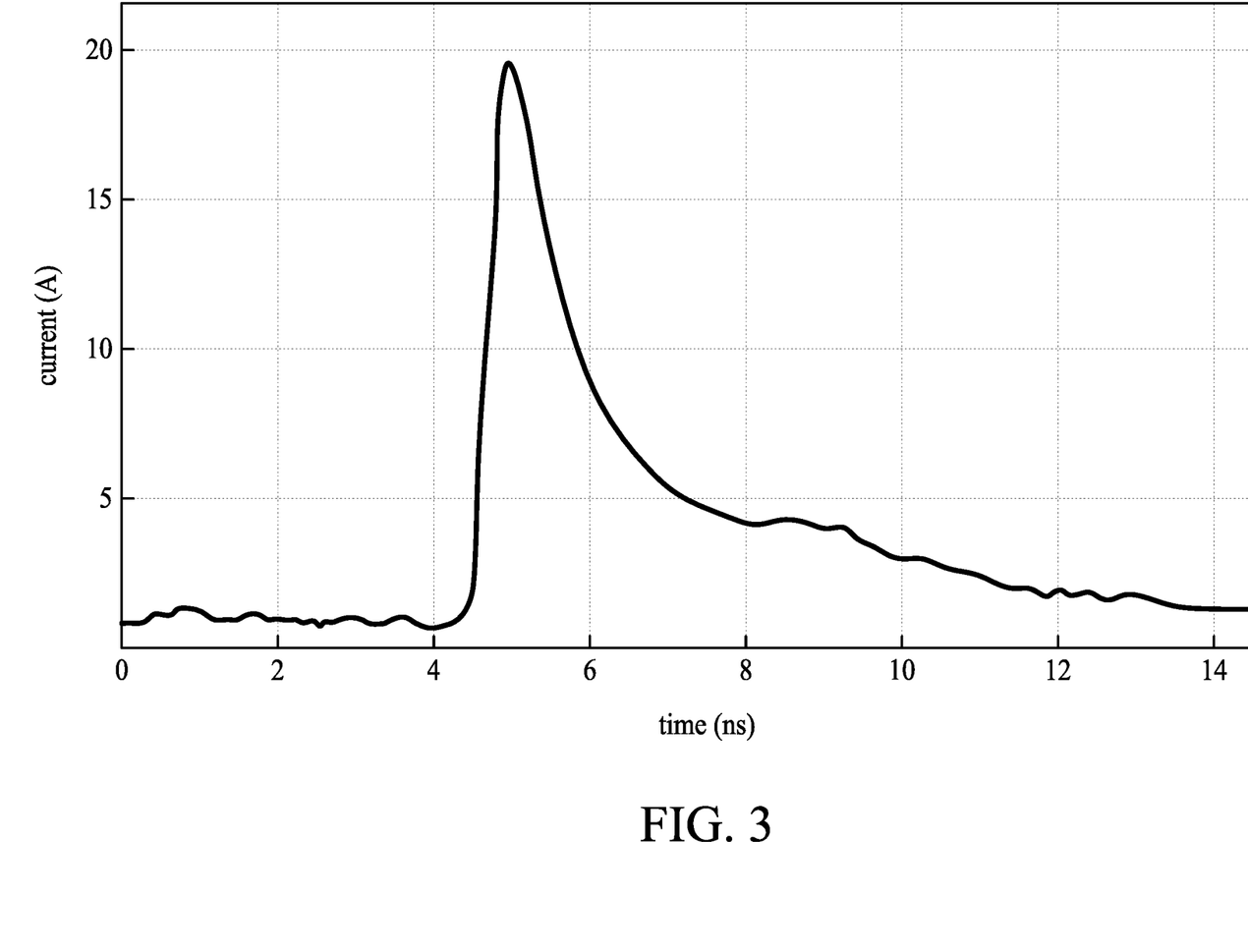
FIG. 3 shows the inrush current data of the circuit macro of FIG. 2 using the power switch circuits that are switched on at the same time.
Figure 4:
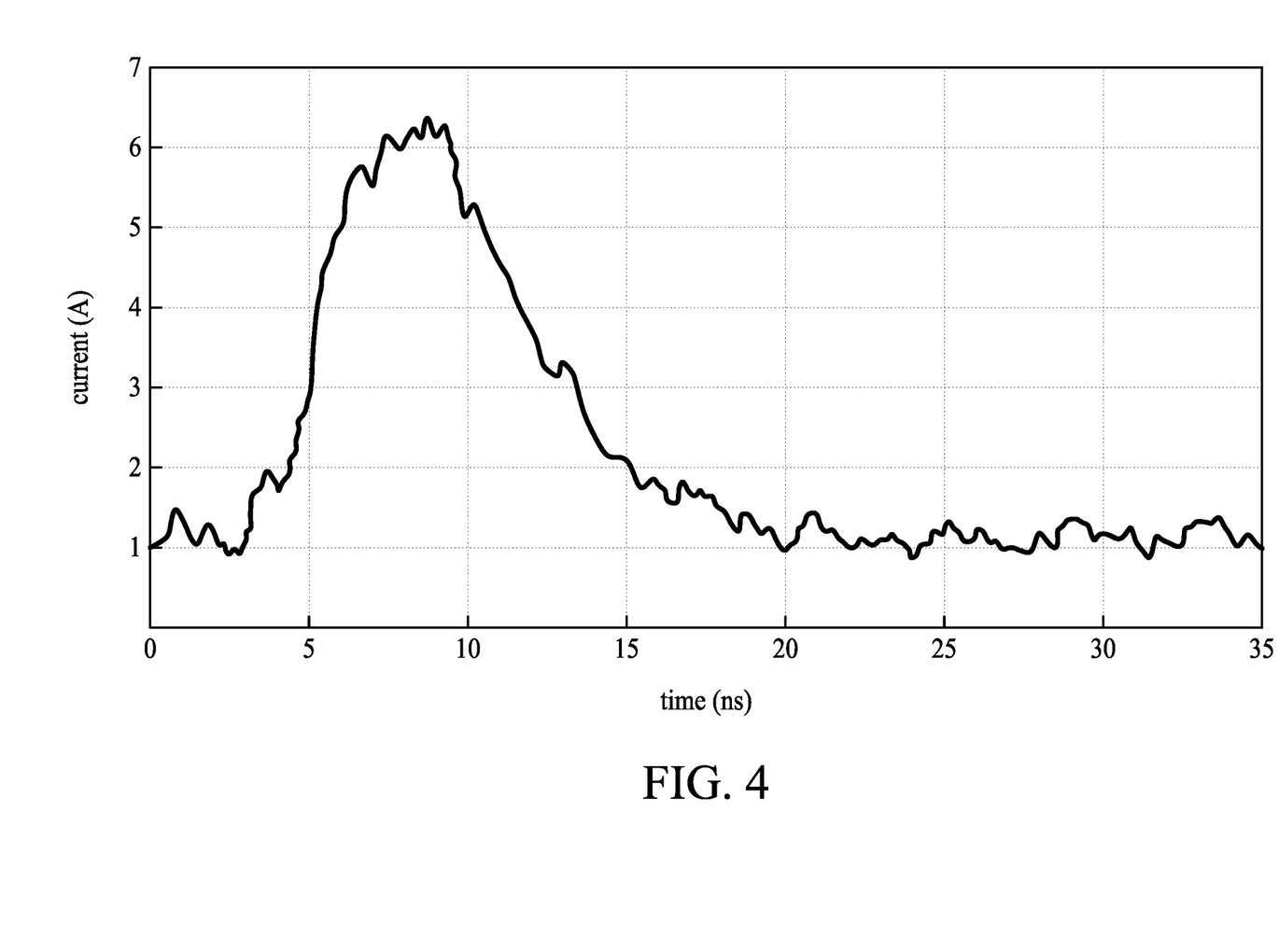
FIG. 4 shows the inrush current data of the semiconductor device of FIG. 2.

FIG. 3 shows the inrush current data of the circuit macro 102 using the power switch circuits that are switched on at the same time; FIG. 4 shows the inrush current data of the semiconductor device 200. The results indicate that using a plurality of serially connected power switch circuits 108a to 108d can effectively reduce the inrush current from the peak value of 19 A to less than 7 A, when waking up the circuit macro 102 from the power saving mode.

Figure 5:
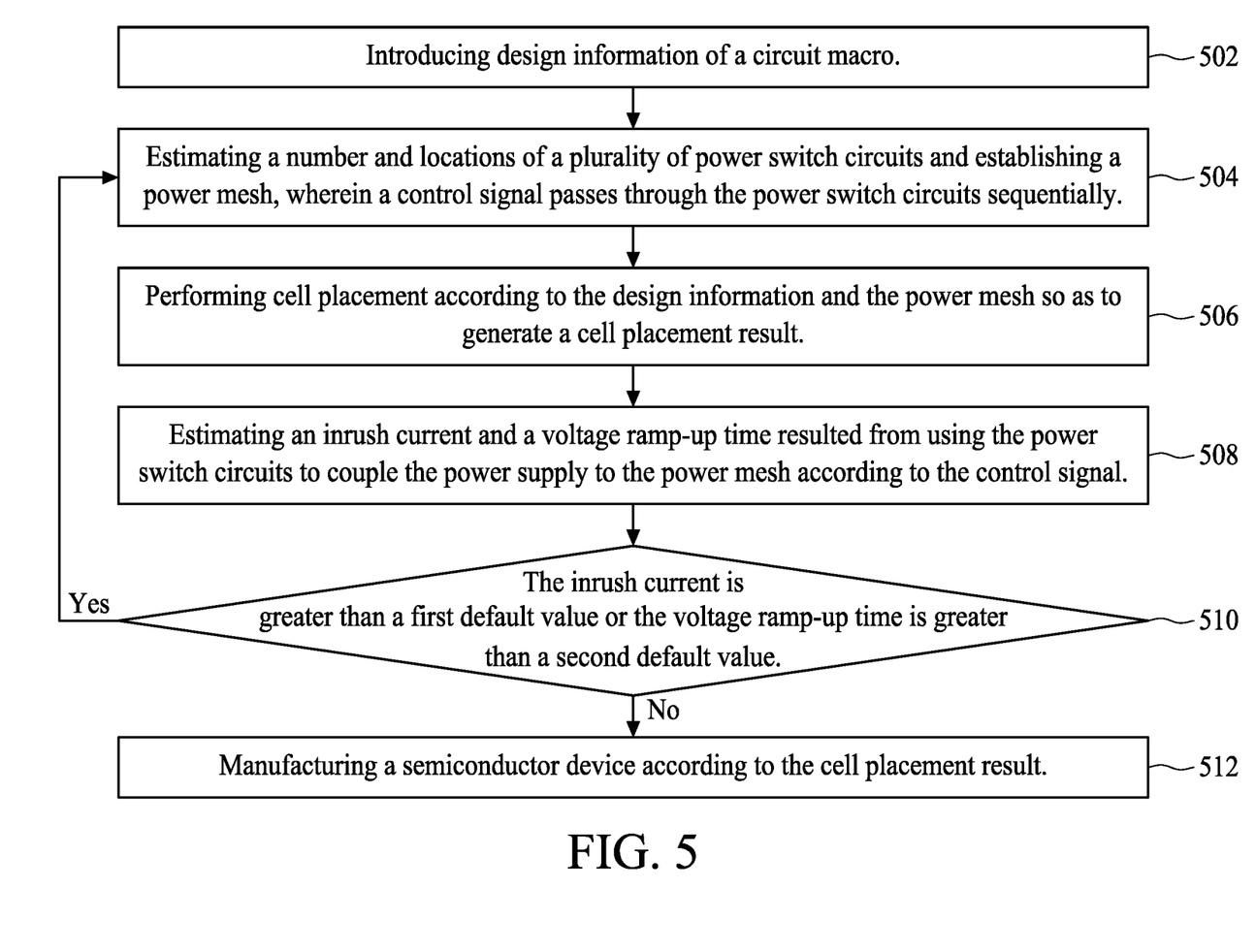
FIG. 5 is a flow chart illustrating the embodiment of the manufacturing method of the semiconductor device of FIG. 1.

FIG. 5 is a flow chart illustrating the manufacturing method of the semiconductor device 100 according to an embodiment of the present invention. In step 502, the design information of the circuit macro 102 is introduced, wherein the design information may include a netlist, which includes the Synopsys design constraint (SDC) file and floor plan regarding the design constraints and a layout plan.

Next, in step 504, the numbers of the power switch circuits 108a, the power switch circuits 108b, the power switch circuits 108c and the power switch circuits 108d and their locations in the layout are estimated according to the design information and a default or estimated inrush current (the estimated inrush current is obtained in step 508; see detailed discussion below) and the voltage ramp-up time; specifically, the power switch circuits 108a to 108d are disposed at the first side, the third side, the second side and the fourth side of the circuit macro 102 respectively. Furthermore, a plurality of metal lines 104 of the first power mesh 14 and a plurality of metal lines 106 of the second power mesh 16 are generated according to the design information; as discussed above, the power switch circuits 108a and the power switch circuits 108c selectively couple the power supply P to the first power mesh 14, according to the control signal SC, respectively; the power switch circuits 108b and the power switch circuits 108d selectively couple the power supply P to the second power mesh 16 according to the control signal SC, respectively; and the power switch circuits 108a to 108d are arranged in sequence and surround the circuit macro 102, wherein the control signal output terminal co of one power switch circuit is connected with the control signal input terminal ci of the next power switch circuit, so that the control signal SC passes through the power switch circuits 108a to 108d sequentially.

After arranging the power switch circuits 108a to 108d and the first power mesh 14 and the second power mesh 16, in step 506, cell placement of the circuit macro 102 is performed according to the design information and the first power mesh 14 and the second power mesh 16, so as to generate a cell placement result. For example, the semiconductor standard cell provide by the semiconductor manufacturer can be used when performing the cell placement of the circuit macro 102.

Next, in step 508, the inrush current and voltage ramp-up time resulted from using the power switch circuits 108a to 108d to couple the power supply P to the first power mesh 14 and the second power mesh 16 according to the control signal SC are estimated, and in step 510, it is determined that whether the estimated inrush current is greater than a first default value or whether the estimated voltage ramp-up time is greater than a second default value; if yes, then the method returns to step 504, in which the numbers of the power switch circuits 108a to 108d and their locations in the layout is re-estimated according to the design information and the estimated inrush current or voltage ramp-up time; if not, then the method proceeds to step 512, in which the semiconductor device 100 is manufactured according to the cell placement result generated in step 506. Additionally, in step 512, a routing result may be further generated by carrying out a routing process according to the cell placement result, and the semiconductor device 100 is manufactured according to the routing result.

Figure 6:
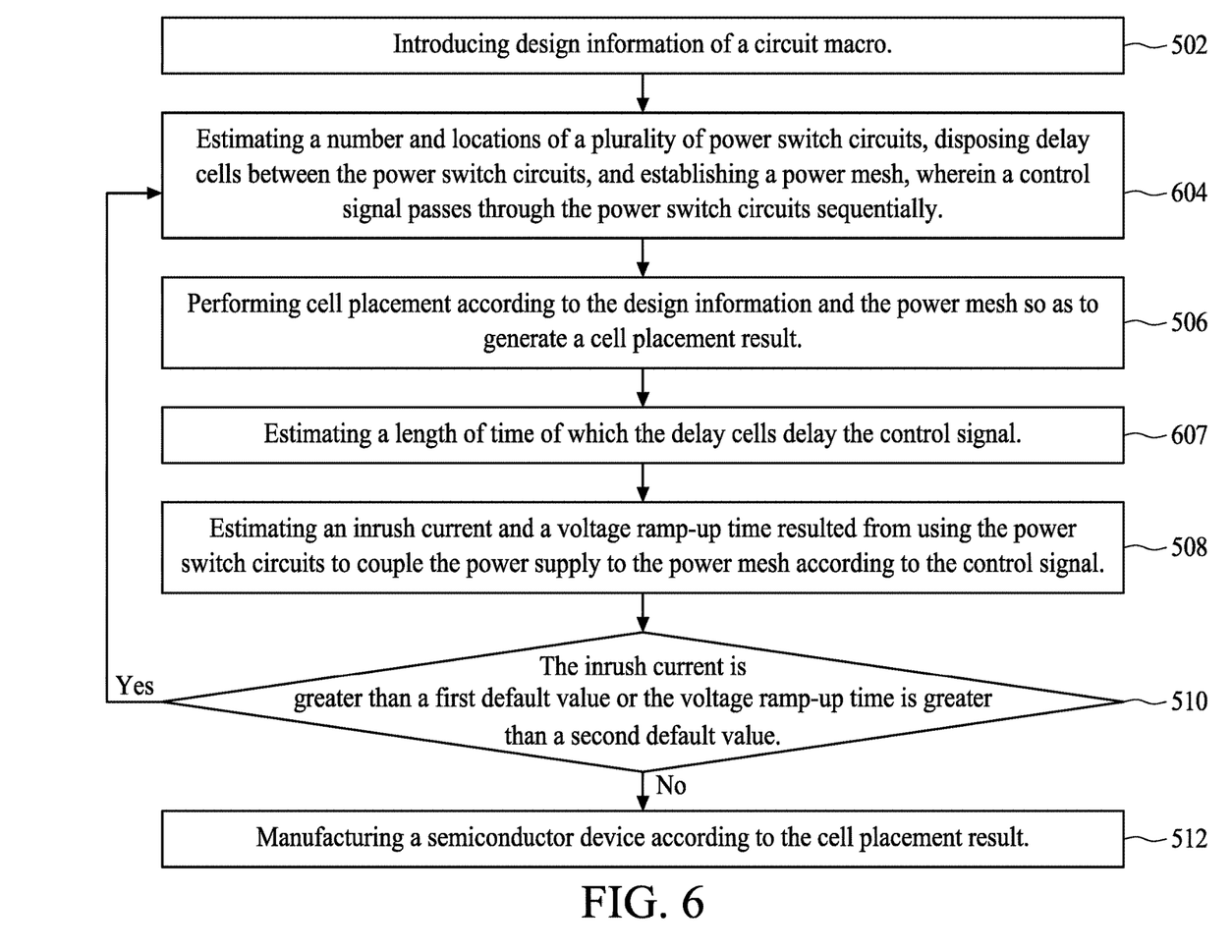
FIG. 6 is a flow chart illustrating the embodiment of the manufacturing method of the semiconductor device of FIG. 2.

FIG. 6 is a flow chart illustrating the manufacturing method of the semiconductor device 200 according to embodiments of the present invention. Compared with the flow chart of the manufacturing method for the semiconductor device 100 as shown in FIG. 5, in the flow chart of the method for manufacturing the semiconductor device 200, the step 504 is replaced by step 604, and an additional step 607 is included between step 506 and 508, so as to implement the differences between the semiconductor device 200 and the semiconductor device 100, i.e., the delay cell d. Specifically, as compared with step 504, in step 604, a delay cell d for delaying the control signal SC is further disposed between the control signal output terminal co of a preceding power switch circuit of the power switch circuits 108a to 108d and the control signal input terminal ci of its next power switch circuit. The newly introduce step 607 includes estimating the length of time that the delay cells d delay that control signal SC according to the default or estimated inrush current and voltage ramp-up time.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, powered by a power supply, wherein the semiconductor device comprises:
    a circuit macro, configured to execute a specific function;
        a first power mesh, including a plurality of metal lines extending along a first direction from a first side of the circuit macro to a second side of the circuit macro, wherein the first power mesh is coupled to the circuit macro; and
    a plurality of first power switch circuits, wherein each of the plurality of first power switch circuits includes:
        a control signal input terminal, configured to receive a control signal;
        a control signal output terminal, configured to output the control signal;

a power input terminal, coupled to the power supply; and a power output terminal, coupled to the first power mesh;

wherein the plurality of first power switch circuits selectively couple the power supply to the first power mesh according to the control signal, respectively, and the plurality of first power switch circuits are arranged in sequence, wherein the control signal output terminal of each of the first power switch circuits except for a last one of the first power switch circuits is coupled to the control signal input terminal of a next one of the first power switch circuits, so that the control signal passes through the plurality of first power switch circuits sequentially.

2. The semiconductor device of claim 1, wherein each of the plurality of first power switch circuits further comprises a delay cell between the control signal output terminal of each first power switch circuit and the control signal input terminal of the next first power switch circuit, wherein the delay cell is configured to delay the control signal.

3. The semiconductor device of claim 2, further comprising a delay control circuit, configured to control a length of time of which the plurality of delay cells delay the control signal.

4. The semiconductor device of claim 1, wherein the plurality of first power switch circuits are disposed at the first side of the circuit macro.

5. The semiconductor device of claim 4, further comprising:

a second power mesh, including a plurality of metal lines extending along a second direction from a third side of the circuit macro to a fourth side of the circuit macro, wherein the second power mesh is coupled to the circuit macro, and the second direction differs from the first direction.

6. The semiconductor device of claim 5, further comprising a plurality of second power switch circuits, wherein each of the plurality of second power switch circuits includes:

a control signal input terminal, configured to receive the control signal;

a control signal output terminal, configured to output the control signal;

a power input terminal, coupled to the power supply; and a power output terminal, coupled to the second power mesh;

wherein the plurality of second power switch circuits selectively couple the power supply to the second power mesh according to the control signal, respectively, and the plurality of second power switch circuits are arranged in sequence, wherein the control signal output terminal of each of the second power switch circuits except for a last one of the second power switch circuits is coupled to the control signal input terminal of a next one of the second power switch circuits, so that the control signal passes through the plurality of second power switch circuits sequentially.

7. The semiconductor device of claim 6, wherein the control signal passes through the plurality of first power switch circuits and the plurality of second power switch circuits sequentially.

8. The semiconductor device of claim 6, wherein each of the plurality of second power switch circuits further comprises a delay cell between the control signal output terminal of each second power switch circuit and the control signal input terminal of the next second power switch circuit, wherein the delay cell is configured to delay the control signal.

9. The semiconductor device of claim 6, wherein the second power switch circuits are disposed at the third side of the circuit macro.

10. The semiconductor device of claim 6, further comprising a plurality of third power switch circuits disposed at the second side of the circuit macro, wherein each of the plurality of third power switch circuits includes:

a control signal input terminal, configured to receive the control signal;

a control signal output terminal, configured to output the control signal;

a power input terminal, coupled to the power supply; and a power output terminal, coupled to the first power mesh;

wherein the plurality of third power switch circuits selectively couple the power supply to the first power mesh according to the control signal, respectively, and the plurality of third power switch circuits are arranged in sequence, wherein the control signal output terminal of each of the third power switch circuits except for a last one of the third power switch circuits is coupled to the control signal input terminal of a next one of the third power switch circuits, so that the control signal passes through the plurality of third power switch circuits sequentially.

11. The semiconductor device of claim 10, further comprising a plurality of fourth power switch circuits disposed at the fourth side of the circuit macro, wherein each of the plurality of fourth power switch circuits includes:

a control signal input terminal, configured to receive the control signal;

a control signal output terminal, configured to output the control signal;

a power input terminal, coupled to the power supply; and a power output terminal, coupled to the second power mesh;

wherein the plurality of fourth power switch circuits selectively couple the power supply to the second power mesh according to the control signal, respectively, and the plurality of fourth power switch circuits are arranged in sequence, wherein the control signal output terminal of each of the fourth power switch circuits except for a last one of the fourth power switch circuits is coupled to the control signal input terminal of a next one of the fourth power switch circuits, so that the control signal passes through the plurality of fourth power switch circuits sequentially.

12. The semiconductor device of claim 11, wherein the control signal passes through the plurality of first power switch circuits, the plurality of second power switch circuits, the plurality of third power switch circuits and the plurality of fourth power switch circuit sequentially.

* * * * *